United States Patent
Wang et al.

(10) Patent No.: US 8,898,495 B2
(45) Date of Patent: Nov. 25, 2014

(54) METHOD AND APPARATUS FOR SWITCHING AN OPERATING SYSTEM BY DETERMINING WHETHER A BOOT-UP MODE IS A GENERAL MODE OR A SWITCH MODE

(75) Inventors: Jiang-Bo Wang, Beijing (CN); Kai Li, Beijing (CN); Xiao-Long Wang, Beijing (CN); Xiong Zhang, Beijing (CN)

(73) Assignee: VIA Technologies, Inc., New Taipei (TW)

( * ) Notice: Subject to any disclaimer, the term of this patent is extended or adjusted under 35 U.S.C. 154(b) by 278 days.

(21) Appl. No.: 13/304,402

(22) Filed: Nov. 24, 2011

(65) Prior Publication Data

US 2012/0226925 A1    Sep. 6, 2012

(30) Foreign Application Priority Data

Mar. 3, 2011    (CN) .......................... 2011 1 0056317

(51) Int. Cl.
G06F 1/32 (2006.01)
G06F 9/48 (2006.01)

(52) U.S. Cl.
CPC .............. *G06F 9/485* (2013.01); *G06F 1/3203* (2013.01); *Y02B 60/144* (2013.01)
USPC ........................................................ 713/321

(58) Field of Classification Search
CPC .......................... G06F 1/3203; Y02B 60/1217
USPC ...................... 713/100, 321, 300, 2
See application file for complete search history.

(56) References Cited

U.S. PATENT DOCUMENTS

| | | |
|---|---|---|
| 2001/0018717 A1 | 8/2001 | Shimotono |
| 2005/0216722 A1* | 9/2005 | Kim et al. .......................... 713/2 |
| 2008/0092145 A1* | 4/2008 | Sun et al. ...................... 719/312 |
| 2009/0063845 A1 | 3/2009 | Lin |
| 2010/0241839 A1* | 9/2010 | Banga et al. ...................... 713/2 |
| 2010/0325405 A1* | 12/2010 | Laue ................................. 713/2 |
| 2011/0022832 A1* | 1/2011 | Motohama et al. ............... 713/2 |

FOREIGN PATENT DOCUMENTS

| | | |
|---|---|---|
| CN | 101382833 | 3/2009 |
| CN | 101419560 | 4/2009 |

OTHER PUBLICATIONS

"First Office Action of China Counterpart Application", issued on May 22, 2012, p. 1-p. 7.
"Second Office Action of China counterpart application" issued on Feb. 22, 2013, p. 1-p. 8, in which CN101382833 was cited.

* cited by examiner

*Primary Examiner* — Thomas Lee
*Assistant Examiner* — Gayathri Sampath
(74) *Attorney, Agent, or Firm* — Jianq Chyun IP Office

(57) ABSTRACT

A method for switching an operating system (OS) and an electronic apparatus are provided. While switching to a first OS, a system firmware stored in a memory unit declares that a first segment of a system memory is in a usable state and a second segment of the system memory is in a reserved state by using a first resource description table, so that the first OS is in a working state in the first segment and a second OS is in a power-saving state in the second segment. While switching to the second OS, the system firmware declares that the second segment is in the usable state and the first segment is in the reserved state by using a second resource description table, so that the second OS is in the working state and the first OS is in the power-saving state.

18 Claims, 4 Drawing Sheets

METHOD AND APPARATUS FOR SWITCHING AN OPERATING SYSTEM BY DETERMINING WHETHER A BOOT-UP MODE IS A GENERAL MODE OR A SWITCH MODE

CROSS-REFERENCE TO RELATED APPLICATION

This application claims the priority benefit of China application serial no. 201110056317.3, filed on Mar. 3, 2011. The entirety of the above-mentioned patent application is hereby incorporated by reference herein and made a part of this specification.

BACKGROUND OF THE INVENTION

1. Field of the Invention

The invention generally relates to a method of using multiple operating systems (OS) and an application thereof, and more particularly, to a method for switching OS and an electronic apparatus using the same.

2. Description of Related Art

Along with the development of technologies, electronic apparatuses in the market have been developed to offer different functions in order to meet different user requirements. A user may install multiple operating systems (OS) in an electronic apparatus in order to achieve different functions. For example, both the Mac OS and the MS Windows OS may be installed in an electronic apparatus. Generally speaking, there are two methods to switch between two OSs. One method is to enter another OS by re-starting the electronic apparatus, and the other method is to switch between two OSs by using a virtualization technology. Regarding to the re-starting the electronic apparatus, it means the electronic apparatus is turned off (power shutdown) first, and then the electronic apparatus is turned on again to load another OS.

For example, two OSs are run by a virtual machine software (i.e., a virtual OS is adopted for controlling hardware behaviours and providing information to the two OSs) so that the first OS and the second OS become two client OSs of the virtual OS. Accordingly, the electronic apparatus can switch between the first OS and the second OS through the virtual OS. Additionally, the second OS may be started from the first OS through the virtualization technology. Namely, though a user can not see image of the first OS and consider he or she is using the second OS now, not the first OS, the first OS is still working when the system switches to the second OS, which is very power-consuming to the system.

The conventional techniques either spend a lot of time to re-start an electronic apparatus or waste a lot of power to switch between two OSs by using a middleware. Besides, when a middleware is adopted to switch between two OSs, the processor executes the two OSs at the same time and accordingly the processing speed of the processor is affected.

SUMMARY OF THE INVENTION

Accordingly, the invention is directed to an operating system (OS) switching method for quickly switching between multiple OSs.

Accordingly, the invention is directed to an electronic apparatus, wherein a system memory is divided into a plurality of blocks to be respectively used by a plurality of OSs.

The invention provides a method for switching an OS adapted to an electronic apparatus having a processor and a system memory. In the method, when the electronic apparatus switches to a first OS, a first segment in the system memory is declared to be in a usable state and a second segment in the system memory is declared to be in a reserved state by using a first resource description table, so that the first OS is in a working state in the first segment and a second OS is in a power-saving state on the second segment. When the electronic apparatus switches to the second OS, the second segment is declared to be in the usable state and the first segment is declared to be in the reserved state by using a second resource description table, so that the second OS is in the working state in the second segment and the first OS is in the power-saving state in the first segment.

The invention provides an electronic apparatus including a processor, a system memory, and a memory unit. The system memory and the memory unit are respectively coupled to the processor. The system memory includes a first segment and a second segment. The memory unit stores a system firmware, a first resource description table, and a second resource description table. When the electronic apparatus switches to a first OS, the system firmware declares that the first segment is in a usable state and the second segment is in a reserved state by using the first resource description table, so that the first OS is in the working state in the first segment and the second OS is in the power-saving state in the second segment. When the electronic apparatus switches to a second OS, the system firmware declares that the second segment is in the usable state and the first segment is in the reserved state by using a second resource description table, so that the second OS is in the working state in the second segment and the first OS is in the power-saving state in the first segment.

As described above, in the invention, multiple OSs can be ran on an electronic apparatus, and at any time, only one of the OSs is ran while the other OSs are in a power-saving state. Thereby, the efficiency of OS loading is improved.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
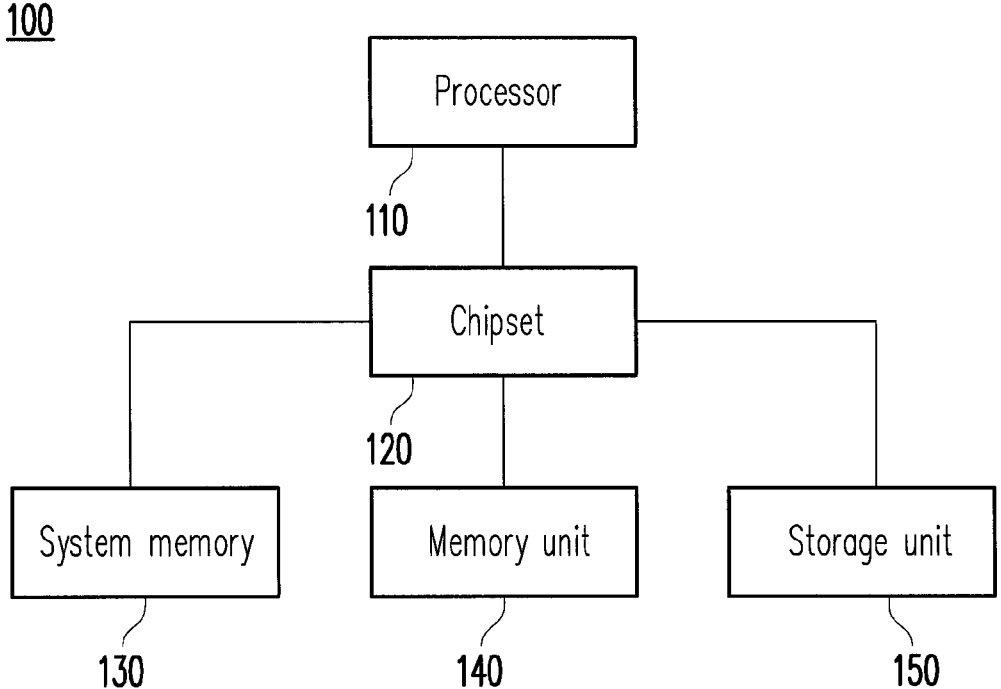
FIG. 1 is a block diagram of an electronic apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

When an electronic apparatus having multiple operating systems (OS) switches OS, the system usually needs to be re-started, which is very inconvenient. Accordingly, the invention provides a method for switching the OS, wherein the system can be quickly switched between multiple OSs, and unused OSs are controlled to be in a power-saving state so that the power consumption of the system can be reduced. Below, embodiments of the invention will be described with reference to accompanying drawings.

FIG. 1 is a block diagram of an electronic apparatus according to an embodiment of the invention. Referring to FIG. 1, the electronic apparatus 100 includes a processor 110, a chipset 120, a system memory 130, a memory unit 140, and a storage unit 150. The chipset 120 may be an integration of a south bridge and a north bridge and is connected to the processor 110. The system memory 130, the memory unit 140, and the storage unit 150 are respectively coupled to the processor 110 through the chipset 120. The storage unit 150 may be a hard disk, and a plurality of operating systems (OS) is installed in the storage unit 150. In another embodiment, the chipset 120 may includes a north bridge and a south bridge, wherein the processor 110 and the system memory 130 are coupled to the north bridge, and the north bridge, the memory unit 140, and the storage unit 150 are coupled to the south bridge.

The memory unit 140 may be a read-only memory (ROM), and which is configured to store a system firmware and resource description tables which are generated when the system firmware is performed. In the present embodiment, it is assumed that two OSs are installed, and two resource description tables (for example, a first resource description table and a second resource description table) are stored in the memory unit 140 to be respectively used by the two OSs. Herein the system firmware may be a basic input output system (BIOS).

Figure 2:
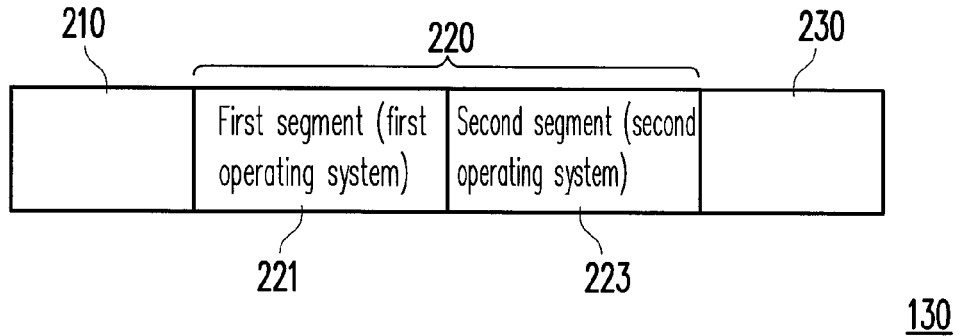
FIG. 2 is a diagram illustrating the space allocation of a system memory according to an embodiment of the invention.

The system memory 130 includes an OS block and a system reservation block. The OS block includes a plurality of segments to be respectively used by a plurality of OSs. In the present embodiment, the segments in the OS block include at least a first segment and a second segment. FIG. 2 is a diagram illustrating the space allocation of a system memory according to an embodiment of the invention. Referring to FIG. 2, the system memory 130 is divided into a block 210, a block 220, and a block 230 when it is in operation. The block 210 and the block 230 are system reservation blocks and no OS can use them. The block 220 is a block usable to OSs (i.e., an OS block). It should be mentioned that the address space of the block 210 may not start from 0. Thus, in another embodiment, the block 210 can be configured in the block 220 (i.e., inserted in the block 220) so that the block 220 for plurality of OSs may have a discontinuous address space (not shown).

To be specific, the address space of the block 210 is taken up by the system firmware and devices such as a video graphics array (VGA). Thus, the block 210 cannot be used by any OS. It should be mentioned that the space allocation of the system memory having the block 210 is adaptable to a computer system. However, in some cases, it is not needed to configure the block 210 in a system memory, and such a space allocation is also adaptable to most electronic apparatuses, not limited to computer systems. To be specific, the system memory 130 is divided into a block 220 and a block 230 when it is in operation, wherein the block 230 is a system reservation block and the block 220 is a block that can be used by an OS. Herein the address space of the block 220 may or may not start from 0.

The block 230 is reserved by the system firmware and used for executing a system firmware routine (for example, a system management mode (SMM)) and storing some information to be protected from destroying any OS when the OS is in operation. Since the block 230 is reserved, it cannot be used by any OS. Since the block 220 is declared by the system firmware to be a usable block, an OS usually only works in the block 220.

In the present embodiment, the system firmware provides different memory segments for different OSs so that these OSs won't disturb each other. For example, the system firmware divides the block 220 in the system memory 130 into a plurality of segments to be used by a plurality of OSs stored in the storage unit 150 illustrated in FIG. 1. Assuming there are two OSs (referred to as a first OS and a second OS thereinafter), the block 220 is divided into a first segment 221 and a second segment 223 to be respectively used by the first OS and the second OS. Namely, the first OS works in the first segment 221, and the second OS works in the second segment 223. It should be noted that in the present embodiment, the first OS and the second OS do not work on their corresponding segments at the same time. Namely, the first segment 221 and the second segment 223 are in different power states at any time.

To be specific, when the system switches to the first OS, the first segment 221 in the system memory 130 is declared to be in a usable state and the second segment 223 in the system memory 130 is declared to be in a reserved state through the system firmware by using a first resource description table, so that the first OS in the first segment 221 is in a working state and the second OS in the second segment 223 is in a power-saving state. The working state may be the S0 state defined in the advanced configuration and power interface (ACPI) specification, and the power-saving state may be the S3 state (suspend to RAM) defined in the ACPI specification. On the other hand, when the system switches to the second OS, the second segment 223 is declared to be in the usable state and the first segment 221 is declared to be in the reserved state through the system firmware by using a second resource description table, so that the second OS in the second segment 223 is in the working state and the first OS in the first segment 221 is in the power-saving state. The working state may be the S0 state defined in the ACPI specification, and the power-saving state may be the S3 state defined in the ACPI specification.

Figure 3:
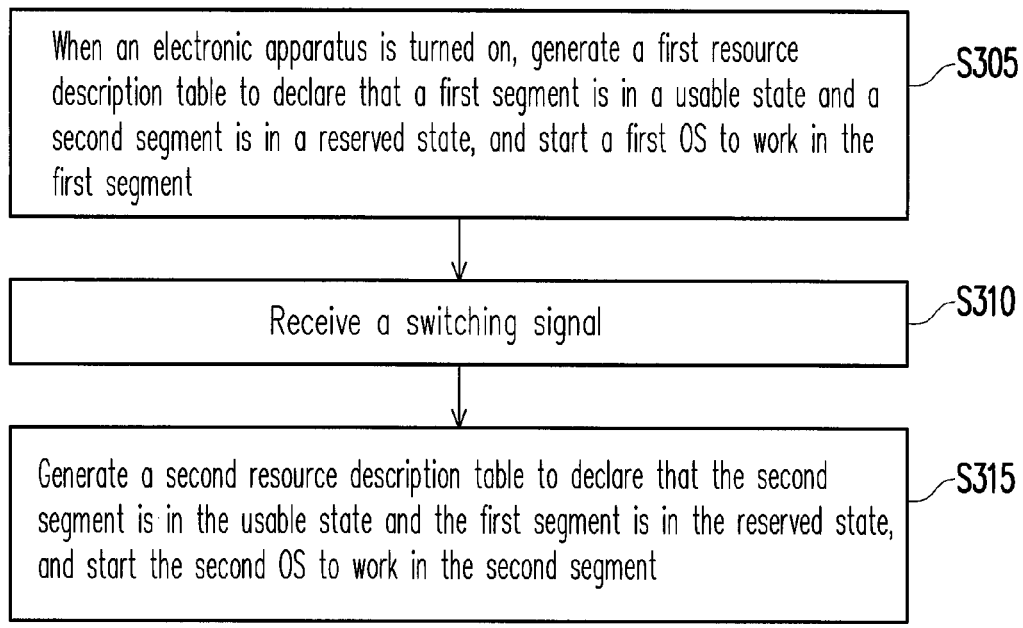
FIG. 3 is a flowchart of an operating system (OS) switching method according to an embodiment of the invention.

The steps for switching OSs will be further explained below. FIG. 3 is a flowchart of an OS switching method according to an embodiment of the invention. Referring to FIG. 1, FIG. 2, and FIG. 3, in step S305, when the electronic apparatus 100 is turned on, the system firmware generates a first resource description table to declare that the first segment 221 is in the usable state and the second segment 223 is in the reserved state, and the system firmware starts the first OS to work in the first segment 221. For example, when the electronic apparatus 100 is turned on, the system firmware generates the first resource description table in the memory unit 140 and declares the position and size of the first segment 221 in the first resource description table according to the memory requirement of the first OS. In addition, the system firmware declares that the first segment 221 is in the usable state and the second segment 223 is in the reserved state by using the first resource description table.

For example, a user first starts an OS. Herein it is assumed that the first OS is first started by the user. Before starting the first OS, the system firmware declares that the first segment 221 is in the usable state and the second segment 223 is in the reserved state. Accordingly, the first OS works only in the first segment 221 after it is started.

After that, if the user wants to switch to the second OS, the user can do so by pressing down a key (for example, a hot key). Thereafter, in step S310, the system firmware receives a switching signal. Then, in step S315, the system firmware generates a second resource description table to declare that the second segment 223 is in the usable state and the first segment 221 is in the reserved state and starts the second OS to work in the second segment 223. For example, the system firmware generates the second resource description table in the memory unit 140 and declares the position and size of the second segment 223 in the second resource description table according to the memory requirement of the second OS and the first resource description table. Besides, the system firmware declares that the second segment 223 is in the usable state and the first segment 221 is in the reserved state. Accordingly, the second OS works only in the second segment 223.

It should be mentioned that if the first OS and the second OS are already respectively loaded into the first segment 221 and the second segment 223, the first OS in the first segment 221 is in the working state and the second OS in the second segment 223 is in the power-saving state through the first resource description table, and the second OS in the second segment 223 is in the working state and the first OS in the first segment 221 is in the power-saving state through the second resource description table. In other words, in step S305 illustrated in FIG. 3, because the second OS is not yet loaded into the second segment 223, the second segment 223 is only declared to be in the reserved state, not in the power-saving state. However, in step S315 illustrated in FIG. 3, because the first OS is already loaded into the first segment 221, the first OS in the first segment 221 is in the power-saving state even though the first segment 221 is declared to be in the reserved state.

Additionally, after step S315, if the two OSs are to be switched, the first OS loaded into the first segment 221 and the second OS loaded into the second segment 223 are switched between the power-saving state and the working state. The user needs not to wait for the electronic apparatus 100 to re-load another OS or switch between different OSs through a virtual OS. Thus, compared to the conventional techniques, the method for switching the OS in the invention is more efficient and consumes less power.

Figure 4:
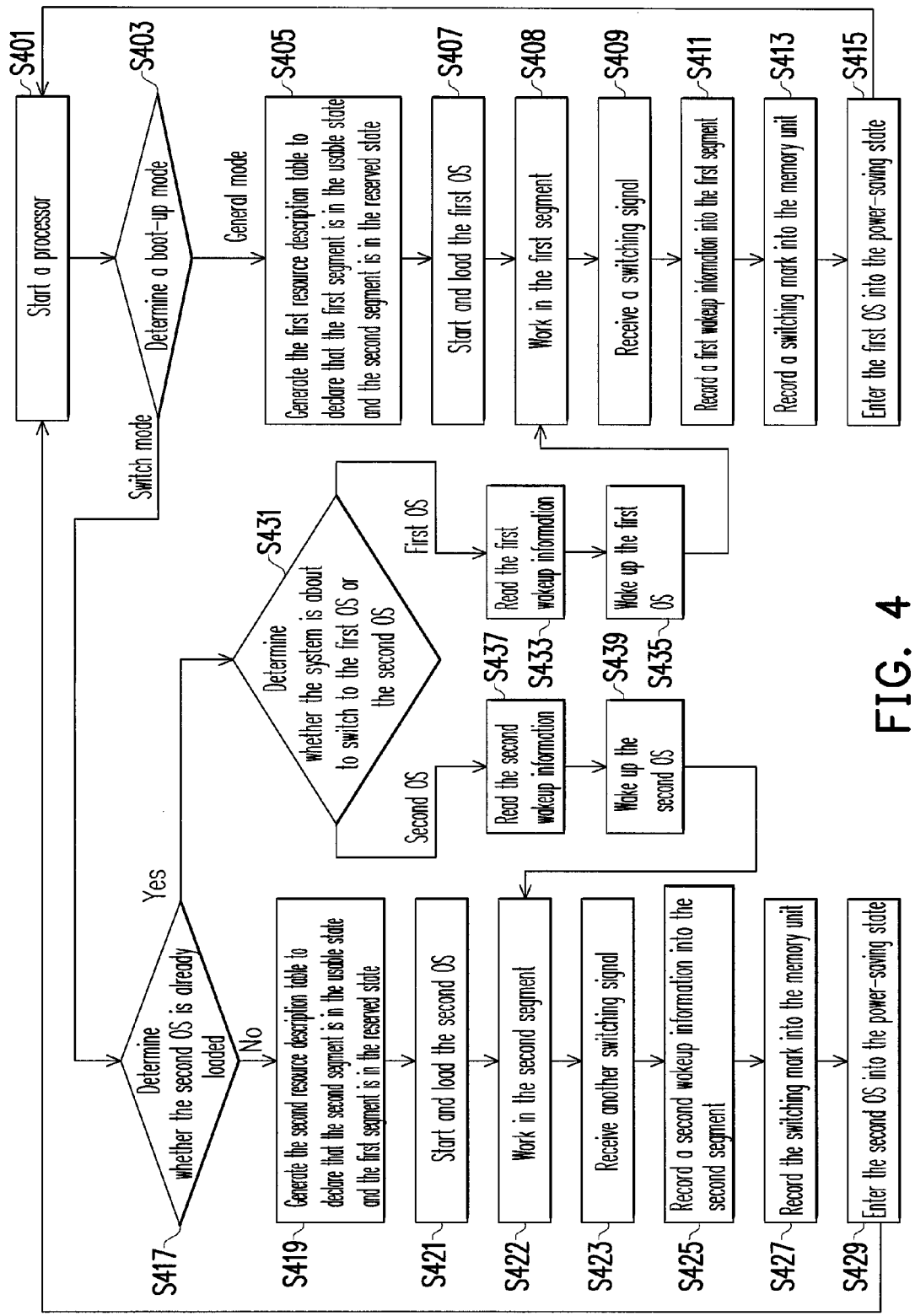
FIG. 4 is a flowchart of an OS switching method according to another embodiment of the invention.

FIG. 4 is a flowchart of a method for switching an OS according to another embodiment of the invention. Referring to FIG. 1, FIG. 2, and FIG. 4, in step S401, the processor 110 is started. Then, in step S403, whether the boot-up mode is a general mode or a switch mode is determined. To be specific, when the electronic apparatus 100 is just turned on, the boot-up mode thereof is the general mode, while when the processor 110 is re-started from one of the OSs, the boot-up mode thereof is the switch mode. The switch mode will be explained in detail later on.

If the boot-up mode is the general mode, in step S405, the first resource description table is generated to declare that the first segment 221 is in the usable state and the second segment 223 is in the reserved state. Herein because the first OS is not started yet, the system firmware generates the first resource description table in the memory unit 140. Next, in step S407, the first OS is started and loaded. To be specific, the first OS is loaded from the storage unit 150 into the first segment 221. After that, in step S408, the first OS works in the first segment 221. In other words, the first OS is in the working state (for example, the S0 state defined in the ACPI specification). Herein the user can operate the electronic apparatus 100 under the first OS.

Thereafter, the user can switch to the second OS from the first OS by pressing a key. In step S409, the system firmware receives a switching signal. Then, in step S411, a first wakeup information used for waking up the first OS is recorded into the first segment 221. Next, in step S413, a switching mark is recorded into the memory unit 140. Herein the switching mark is used for indicating that the system switches from the first OS to the second OS. After that, in step S415, the first OS is controlled to enter the power-saving state.

To be specific, to start the second OS without turning off the first OS, the first OS is first controlled to enter the power-saving state (for example, the S3 state defined in the ACPI specification). It is mentioned the power is still applied to the system for keeping the loaded first OS in the first segment. Before entering the first OS into the power-saving state, the first wakeup information required for waking up the first OS again is stored into the first segment 221. During the process of entering the power-saving state, the system is controlled by the system firmware. The system firmware may understand the user's requirement by user's setting and store the related to information into the memory unit 140 (i.e., stores a switching mark which indicates that the system switches from the first OS to the second OS into the memory unit 140) and controls the processor 110 to re-start. In another embodiment, the switching mark can be stored in the system memory 130. In yet another embodiment, the switching mark can be stored in both the system memory 130 and the memory unit 140.

Thereafter, step S401 is executed again to re-start the processor 110. It is mentioned the power is still applied to the system for keeping the loaded first OS in the first segment 221 from the step S415 to the step 401. After that, the current boot-up mode is determined based on the switching mark (for example, whether the switching mark is recorded) in the memory unit 140 in step S403. To be specific, if the switching mark is recorded in the memory unit 140, it indicates the electronic apparatus 100 is not turned on for the first time, so the boot-up mode is the switch mode. Accordingly, in step S417, whether the second OS is already loaded into the second segment is determined. If the second OS is not started yet, in step S419, the second resource description table is generated to declare that the second segment 223 is in the usable state and the first segment 221 is in the reserved state. For example, the system firmware generates the second resource description table in the memory unit 140. Next, in step S421, the second OS is started and loaded. To be specific, the second OS is loaded from the storage unit 150 into the second segment 223. After that, in step S422, the second OS works in the second segment 223. In other words, the second OS is in the working state (for example, the S0 state defined in the ACPI specification). Herein the user can operate the electronic apparatus 100 from the second OS, and the first OS remains in the power-saving state (for example, the S3 state defined in the ACPI specification).

To be specific, after the processor 110 is re-started, the system is controlled under the system firmware. The system firmware obtains the previous information (i.e., the switching mark) of the system from the memory unit 140 and understands that the system will be under the second OS by switching. Thus, the system firmware declares that the first segment 221 is in the reserved state and the second segment 223 is in the usable state by using the second resource description table and starts the second OS. Accordingly, the second OS works only in the second segment 223.

After that, in step S423, another switching signal is received in the second OS. In step S425, the second wakeup information required for waking up the second OS again is recorded into the second segment 223. Then, in step S427, the switching mark is recorded into the memory unit 140. Herein the switching mark indicates that the system switches from the second OS to the first OS. In step S429, the second OS is controlled to enter the power-saving state.

Namely, if herein the user wants to switch from the second OS to the first OS, the second OS should be controlled to enter the power-saving state first. It means the power is still applied to the system keeping the loaded second OS in the second segment. Before entering the second OS into the power-saving state, the second wakeup information required for waking up the second OS again is stored into the second segment 223. During the process of entering the power-saving state, the system is controlled by the system firmware. The system firmware stores the switching information into the memory unit 140 (i.e., stores the switching mark which indicates that the system switches from the second OS to the first OS into the memory unit 140) and controls the processor 110 to re-start.

After that, step S401 is executed again to re-start the processor 110. It is mentioned the power is still applied to the system keeping the loaded second OS in the second segment 223 from the step S429 to the step 401. When the first OS and the second OS are both loaded into the system memory 130, it is determined that the boot-up mode is the switch mode and the second OS is already started (i.e., both OSs have been loaded into the system memory 130) in the step 417. Next, in step S431, whether the system is about to switch to the first OS or the second OS is determined, and the first OS or the second OS is woken up accordingly. For example, the switching mark is read to determine whether the system is about to switch to the first OS or the second OS.

If the system is about to switch to the first OS, in step S433, the first wakeup information is read from the first segment 221. Then, in step S435, the first OS is woken up by using the first wakeup information. Next, in step S408, the first OS works in the first segment 221. Herein the second OS in the second segment 223 is in the power-saving state. In addition, before waking up the first OS, the first segment 221 is declared to be in the usable state and the second segment 223 is declared to be in the reserved state. Contrarily, if the system is about to switch to the second OS, in step S437, the second wakeup information is read from the second segment 223. Then, in step S439, the second OS is woken up by using the second wakeup information. After that, in step S422, the second OS works in the second segment 223. Herein the first OS in the first segment 221 is in the power-saving state. In addition, before waking up the second OS, the second segment 223 is declared to be in the usable state, and the first segment 221 is declared to be in the reserved state.

Assuming that the system is about to switch from the second OS to the first OS, when the first OS and the second OS are both loaded into the system memory 130, the system firmware obtains the switching mark from the memory unit 140 and determines that the first OS is to be woken up after re-start the processor 110. Thus, the system firmware declares that the first segment 221 is in the usable state and the second segment 223 is in the reserved state and guides the system to wake up the first OS. Because the first segment 221 is declared to be in the reserved state when the second OS is running, the content in the first segment 221 is not disturbed by the second OS. Thus, the first OS can be woken up according to the first wakeup information stored in the first segment 221, so that the OS can quickly switch from the second OS to the first OS without reloading the first OS from the storage unit again. The time spent by foregoing OS switch process includes only the time for entering the second OS into the power-saving state and the time for waking up the first OS, and after the first OS is woken up, the previous working state of the first OS can be completely restored. In other words, when the system is switched from the second OS to the first OS, the system needs not to be power-shutdown and turned on again to re-load another OS. To be specific, if the system is shut down, the data stored in the system memory is lost and accordingly an OS needs to be loaded again. As a result, a lot of time will be wasted on OS switching.

Figure 5:
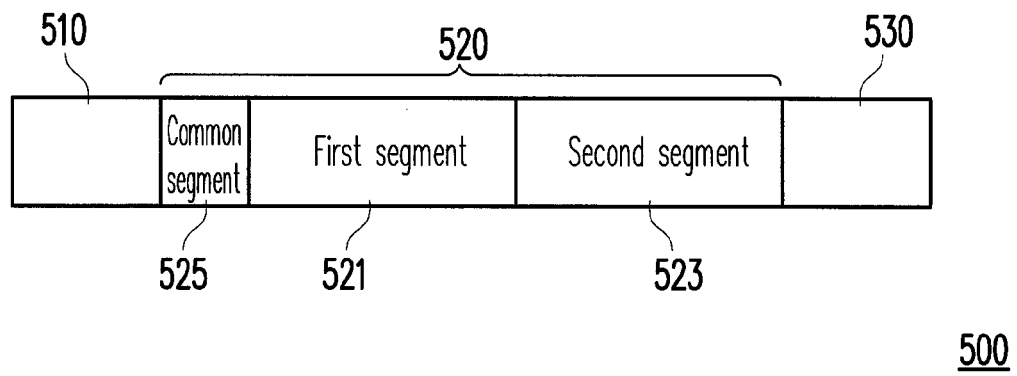
FIG. 5 is a diagram illustrating the space allocation of a system memory according to another embodiment of the invention.

FIG. 5 is a diagram illustrating the space allocation of a system memory according to another embodiment of the invention. Referring to FIG. 5, the system memory 500 includes a block 510, a block 520, and a block 530. The address space of the block 510 is taken up by the system firmware (for example, a BIOS) and a VGA. The block 530 is declared by the system firmware to be in a reserved state and used for executing a system firmware routine and storing some information to be protected from destroying any OS when the OS is in operation. The block 520 is declared by the system firmware as a usable block, and OSs usually only work in the block 520.

In the present embodiment, the block 520 is divided into 3 segments, wherein a first segment 521 is used by a first OS, a second segment 523 is used by a second OS, and a common segment 525 is used by both OSs. The block 520 is partitioned in such a manner because an OS may require a portion of its address space starting from 0 used as the essential address space during its operation. Generally, the size of the common segment 525 is much smaller than those of the first segment 521 and the second segment 523.

When the system is about to switch from the first OS to the second OS, data in the common segment 525 is first backed up to the first segment 521 before the system switches to the second OS. When the system is about to switch from the second OS back to the first OS, the backup data of the common segment 525 is restored from the first segment 521 to the common segment 525. Contrarily, when the system is about to switch from the second OS to the first OS, data in the common segment 525 is first backed up to the second segment 523 before the system switches to the first OS. When the system is about to switch from the first OS back to the second OS, the backup data of the common segment 525 is restored from the second segment 523 to the common segment 525.

Taking FIG. 4 as an example, when step S405 is executed, the system firmware declares that the common segment 525 in the system memory 500 is in the usable state by using the first resource description table, so that the first OS can work in the common segment 525 and the first segment 521. Additionally, after step S409 (i.e., after a switching signal is received in the first OS), the system firmware backs up the data in the common segment 525 to the first segment 521. When the step S419 is executed, the system firmware declares that the common segment 525 in the system memory 500 is in the usable state by using the second resource description table, so that the second OS can work in the common segment 525 and the second segment 523.

Moreover, after the second OS is started to work in the second segment 523 and another switching signal is received (i.e., step S423), the data in the common segment 525 is backed up to the second segment 523. If the system is about to switch to the first OS in step S433, the system firmware restores the backup data of the common segment 525 from the first segment 521 to the common segment 525 and declares that the common segment 525 in the system memory 500 is in the usable state by using the first resource description table, so that the first OS can work in the common segment 525. Accordingly, the common segment 525 can be shared by the first OS and the second OS.

As described above, in the invention, a system memory includes an OS block and a system reservation block, and the OS block is divided into a first segment and a second segment to be respectively used by a first OS and a second OS. When one OS being used by the system switches to another OS, the segment corresponding to the later OS is declared to be in a usable state, while the other segment corresponding to the former OS is declared to be in a reserved state. Accordingly, the running OS only works in the corresponding segment. In addition, because the segment corresponding to the first OS is declared to be in the reserved state when the second OS is running, the content of this segment is not disturbed by the second OS. Accordingly, the first OS can be instantly woken up and restored to its original state without reloading the first OS from the storage unit again. Because the time for entering an OS into the power-saving state and waking up the other OS is only a few seconds, the OS switching technique in the invention is much faster than shutting down first and then turning on an electronic apparatus (which takes dozens of seconds). Moreover, through the method for switching the OS provided by embodiments of the invention, after switching to an OS, the previous working state of the OS can be completely resumed, so that the system efficiency after switching the OSs is greatly improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for switching an operating system (OS), adapted to an electronic apparatus having a processor, a system memory and a memory unit, the method comprising:
    determining whether a boot-up mode is a general mode or a switch mode when the electronic apparatus is turned on;
    if the boot-up mode is the general mode, generating a first resource description table by a system firmware in the memory unit to declare that a first segment in the system memory is in a usable state and a second segment in the system memory is in a reserved state, starting and loading the first OS, so that a first OS is in a working state in the first segment; and
    if the boot-up mode is the switch mode, generating a second resource description table by the system firmware in the memory unit when a second OS is not loaded into the second segment to declare that the second segment is in the usable state and the first segment is in the reserved state, starting and loading the second OS, so that the second OS is in the working state in the second segment and the first OS is in the power-saving state in the first segment,
    wherein a switching mark is recorded in the memory unit of the electronic apparatus to indicate that the electronic apparatus switches from the first OS to the second OS or from the second OS to the first OS.

2. The method according to claim 1 further comprising:
    determining whether the electronic apparatus is to be switched to the first OS or the second OS, the step comprises:
        reading the switching mark to determine whether the electronic apparatus is to be switched to the first OS or the second OS;
        when the electronic apparatus is to be switched to the first OS, reading a first wakeup information used for waking up the first OS, wherein the first wakeup information is recorded in the first segment; and
        when the electronic apparatus is to be switched to the second OS, reading a second wakeup information used for waking up the second OS, wherein the second wakeup information is recorded in the second segment.

3. The method according to claim 1, wherein the memory unit comprises a read-only memory (ROM).

4. The method according to claim 1, further comprises:
    receiving a switching signal;
    re-starting the processor, wherein the boot-up mode is the switch mode;
    determining whether the second OS is started and loaded into the second segment;
    when the second OS is not started and loaded into the second segment, generating the second resource description table, and starting and loading the second OS to work in the second segment; and
    when the second OS is already started and loaded into the second segment, determining whether the electronic apparatus is to be switched to the first OS or the second OS, and waking up the first OS or the second OS accordingly.

5. The method according to claim 4, wherein after the step of receiving the switching signal and before the step of re-starting the processor, the method further comprises:
    recording a first wakeup information used for waking up the first OS into the first segment; and
    controlling the first OS to enter the power-saving state.

6. The method according to claim 4, wherein after the step of generating the second resource description table and starting and loading the second OS to work in the second segment, the method further comprises:
    receiving another switching signal;
    recording a second wakeup information used for waking up the second OS into the second segment; and
    controlling the second OS to enter the power-saving state.

7. The method according to claim 4, wherein the step of generating the first resource description table further comprises:
    declaring that a common segment in the system memory is in the usable state by using the first resource description table, so that the first OS works in the common segment;
    after the step of receiving the switching signal, the method further comprises:
        backing up data in the common segment to the first segment; and
        declaring that the common segment in the system memory is in the usable state by using the second resource description table, so that the second OS works in the common segment and the second segment; and
    after the step of starting the second OS to work in the second segment, the method further comprises:
        receiving another switching signal;
        backing up data in the common segment to the second segment;
        restoring the backup data of the first OS of the common segment from the first segment to the common segment; and
        declaring that the common segment in the system memory is in the usable state by using the first resource description table, so that the first OS works in the common segment and the first segment.

8. The method according to claim 1, wherein the step of generating the first resource description table comprises:

declaring a position and a size of the first segment in the first resource description table according to a memory requirement of the first OS.

9. The method according to claim 1, wherein the step of generating the second resource description table comprises:
declaring a position and a size of the second segment in the second resource description table according to a memory requirement of the second OS and the first resource description table.

10. The method according to claim 1, wherein the working state is a S0 state defined in an advanced configuration and power interface (ACPI) specification, and the power-saving state is a S3 state defined in the ACPI specification.

11. An electronic apparatus, comprising:
a processor;
a system memory, coupled to the processor, comprising an OS block and a system reservation block, wherein the OS block comprises a plurality of segments to be respectively used by a plurality of OSs, and the segments comprise at least a first segment and a second segment; and
a memory unit, coupled to the processor, storing a system firmware, a first resource description table, and a second resource description table, wherein
when the electronic apparatus is turned on, the system firmware determines whether a boot-up mode is a general mode or a switch mode, if the boot-up mode is the general mode, the system firmware generates the first resource description table in the memory unit to declare that the first segment is in a usable state and the second segment is in a reserved state, starting and loading the first OS, so that a first OS is in a working state in the first segment;
if the boot-up mode is the switch mode, the system firmware generates the second resource description table in the memory unit when a second OS is not already loaded into the second segment to declare that the second segment is in the usable state and the first segment is in the reserved state, starting and loading the second OS, so that the second OS is in the working state in the second segment, and the first OS is in the power-saving state in the first segment,
wherein the system firmware records a switching mark in the memory unit of the electronic apparatus to indicate that the electronic apparatus is switched from the first OS to the second OS or from the second OS to the first OS, so as to determine whether the electronic apparatus is to be switched to the first OS or the second OS by reading the switching mark.

12. The electronic apparatus according to claim 11, wherein
when the system firmware generates the first resource description table, the system firmware further declares a position and a size of the first segment in the first resource description table according to a memory requirement of the first OS; and
when the system firmware generates the second resource description table, the system firmware further declares a position and a size of the second segment in the second resource description table according to a memory requirement of the second OS and the first resource description table.

13. The electronic apparatus according to claim 11, wherein after the electronic apparatus receives a switching signal, the system firmware records a first wakeup information used for waking up the first OS into the first segment, controls the first OS to enter the power-saving state, and re-starts the processor to re-start the system firmware, so that the system firmware determines whether the second OS is already started and loaded into the second segment, wherein when the second OS is not started and loaded into the second segment, the system firmware generates the second resource description table and starts and loads the second OS to work in the second segment, and when the second OS is already started and loaded into the second segment, the system firmware determines whether to switch to the first OS or the second OS and wakes up the first OS or the second OS accordingly.

14. The electronic apparatus according to claim 11, wherein after the system firmware generates the second resource description table and the electronic apparatus receives another switching signal, the system firmware records a second wakeup information used for waking up the second OS into the second segment and controls the second OS to enter the power-saving state.

15. The electronic apparatus according to claim 11, wherein
the system memory further comprises a common segment, and the system firmware declares that the common segment is in the usable state by using the first resource description table, so as to allow the first OS to work in the common segment and the first segment;
after the electronic apparatus receives a switching signal, the system firmware backs up data in the common segment to the first segment and declares that the common segment is in the usable state by using the second resource description table, so as to allow the second OS to work in the common segment and the second segment; and
after the electronic apparatus receives another switching signal, the system firmware backs up data in the common segment to the second segment, restores the backup data of the first OS of the common segment from the first segment to the common segment, and declares that the common segment is in the usable state by using the first resource description table, so as to allow the first OS to work in the common segment and the first segment.

16. The electronic apparatus according to claim 11, wherein
when the electronic apparatus is to be switched to the first OS, the system firmware reads a first wakeup information used for waking up the first OS, wherein the first wakeup information is recorded in the first segment;
when the electronic apparatus is to be switched to the second OS, the system firmware reads a second wakeup information used for waking up the second OS, wherein the second wakeup info, nation is recorded in the second segment.

17. The electronic apparatus according to claim 16, wherein the memory unit comprises a ROM.

18. The electronic apparatus according to claim 11, wherein the working state is a S0 state defined in an ACPI specification, and the power-saving state is a S3 state defined in the ACPI specification.

* * * * *